United States Patent

Fukuhara et al.

[11] 4,274,721
[45] Jun. 23, 1981

[54] METERING DEVICE OF A CAMERA

[75] Inventors: Toru Fukuhara, Isehara; Takashi Saegusa, Sagamihara, both of Japan

[73] Assignee: Nippon Kogaku K.K., Tokyo, Japan

[21] Appl. No.: 119,454

[22] Filed: Feb. 7, 1980

[30] Foreign Application Priority Data

Feb. 28, 1979 [JP] Japan .............................. 54-24089[U]

[51] Int. Cl.³ .............................................. G03B 7/099
[52] U.S. Cl. ................................................. 354/31
[58] Field of Search ................... 354/23 R, 31, 44, 49, 354/59

[56] References Cited

U.S. PATENT DOCUMENTS

| | | | |
|---|---|---|---|
| 3,850,530 | 11/1974 | Uno et al. ........................... | 354/31 X |
| 4,162,426 | 7/1979 | Tsunekawa et al. ............... | 354/31 X |

*Primary Examiner*—Michael L. Gellner
*Attorney, Agent, or Firm*—Fitzpatrick, Cella, Harper & Scinto

[57] ABSTRACT

A metering device of a camera comprises a first photoelectric device provided with a light-receiving surface divided into a plurality of light-receiving portions each having a predetermined configuration, a second photoelectric device provided with a light-receiving surface divided into a plurality of light-receiving portions having configurations corresponding to the plurality of light-receiving portions of the first photoelectric device, and optical means for forming an object field image on the light-receiving surfaces of the first and second photoelectric devices so that metering areas metered by the light-receiving surfaces of the first and second photoelectric devices partly overlap each other on a phototaking picture and that the entire phototaking picture is substantially covered by the metering areas. The photoelectric devices are disposed so that the metering area, on the phototaking picture, of each of the light-receiving portions of the light-receiving surface of the first photoelectric device and the metering area, on the phototaking picture, of each of the light-receiving portions of the light-receiving surface of the second photoelectric device corresponding to the light-receiving portions of the first photoelectric device are substantially symmetrical with respect to a bisector of the phototaking picture.

3 Claims, 17 Drawing Figures

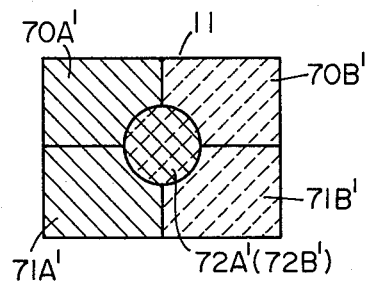
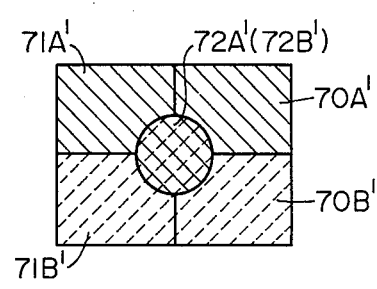
FIG. 4A                FIG. 4B
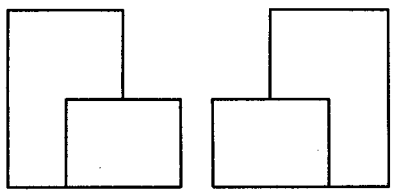
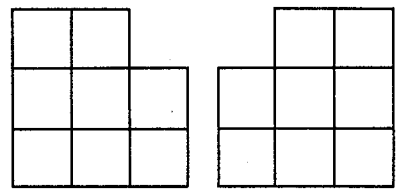
FIG. 5A                FIG. 5B
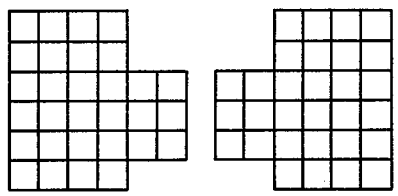
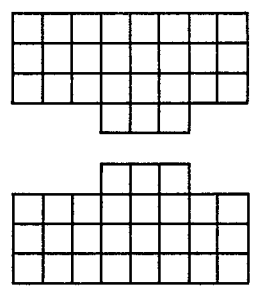
FIG. 5C                FIG. 5D

METERING DEVICE OF A CAMERA

BACKGROUND OF THE INVENTION

1. Field of the Invention

This invention relates to a metering device of a single lens reflex camera.

2. Description of the Prior Art

There have recently been proposed various metering systems in which a phototaking picture is divided into a plurality of metering areas and the exposure of the entire phototaking picture is determined on the basis of the metering output regarding each of the metering areas.

For example, Japanese Laid-Open Patent Application No. 17725/1978 discloses a technique whereby the light-receiving surface of a photoelectric device is divided into a number of light-receiving portions and an object image formed on a focusing plate by a phototaking lens is reduced and projected upon said light-receiving surface by a relay lens so that exposure is determined by the metering output from each of the light-receiving portions of the light-receiving surface.

However, this technique has the following disadvantages. Since said reduced projected image must properly correspond to the object image formed by the phototaking lens, the relay lens must cover the entire object image formed by said phototaking lens and accordingly, must be a relay lens having a wide angle of view and a high performance which means a high cost. This prevents the metering device from being made compact and also requires the photoelectric device to have a large light-receiving surface. Further, since the light-receiving surface corresponds to the phototaking picture, any positional error of the relay lens or the light-receiving surface of the photoelectric device may result in an error of metering. Accordingly, the relay lens and the photoelectric device must be arranged with high accuracy.

SUMMARY OF THE INVENTION

It is the object of the present invention to overcome the above-noted disadvantages and to provide a metering device of a single lens reflex camera which can enhance the metering accuracy regarding the important metering area of the phototaking picture.

The invention will become fully apparent from the following detailed description thereof taken in conjunction with the accompanying drawings.

BRIEF DESCRIPTION OF THE DRAWINGS

FIGS. 4A and 4B are front views showing the areas on the phototaking picture metered by the light-receiving surfaces of FIGS. 3A and 3B.

FIGS. 5A, 5B, 5C and 5D are front views similar to FIGS. 3A to 3F.

DESCRIPTION OF THE PREFERRED EMBODIMENTS

Figure 1A:
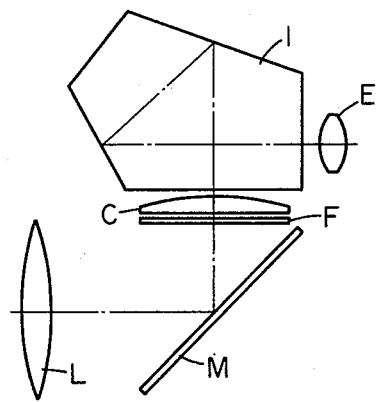
FIG. 1A is a cross-sectional view of the optical system of a single lens reflex camera in which the metering device of the present invention is disposed.
Figure 1B:
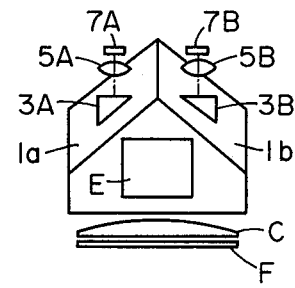
FIG. 1B is a side view showing a portion of FIG. 1A with the phototaking lens and the mirror removed.

An embodiment of the present invention will hereinafter be described with reference to the drawings. In FIGS. 1A and 1B, the light from an object field or scene passes through a phototaking lens L, and then is reflected by a mirror M to form an image on a focusing plate F. This object field image may be observed through a condenser lens C, a pentadach prism 1 and an eyepiece lens E.

Also, more than one half portion of the object field image on the focusing plate F is imaged on the light-receiving surface of a photoelectric device 7A by a prism 3A and a relay lens 5A both attached to one dach surface 1A of the pentadach prism 1, and the remaining portion of the object field image and part of said portion are imaged on the light-receiving surface of a photoelectric device 7B by a prism 3B and a relay lens 5B both attached to the other dach surface 1b. The prisms 3A and 3B, the relay lenses 5A and 5B, and the photoelectric devices 7A and 7B are disposed symmetrically with respect to the optic axis of the phototaking lens L bent by the mirror M.

Figure 2A:
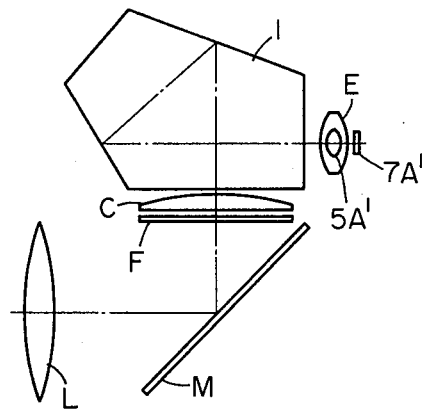
FIGS. 2A and 2B are a cross-sectional view and a side view similar to FIGS. 1A and 1B, respectively.
Figure 2B:
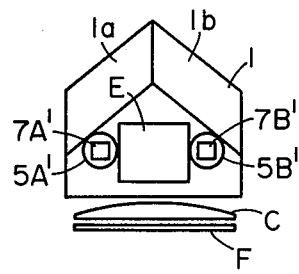
Figure 2C:
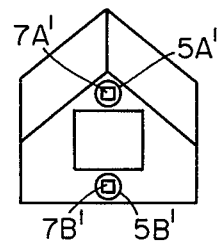
FIG. 2C is a side view showing a modification of the arrangement of FIG. 2B.

FIGS. 2A and 2B show relay lenses 5A', 5B' and photoelectric devices 7A', 7B' arranged at the left-hand and right-hand sides of an eyepiece lens E in such a manner that they are symmetrical with respect to the optic axis of the phototaking lens for the same purpose as that of the FIG. 1 arrangement. FIG. 2C shows an example in which relay lenses 5A', 5B' and photoelectric device 7A', 7B' are arranged above and below an eyepiece lens E in such a manner that they are symmetrical with respect to the optic axis of the phototaking lens.

Figure 3A:
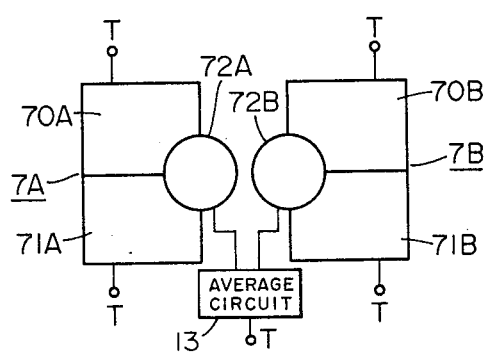
FIGS. 3A, 3B, 3C, 3D, 3E and 3F are front views showing the configurations of the light-receiving surfaces of photoelectric devices in an embodiment of the present invention.

Description will now be made of the configuration of the light-receiving surfaces of the photoelectric devices 7A, 7B and 7A', 7B' shown in FIGS. 1 and 2 (in the following description, 7A and 7B will be handled as including 7A' and 7B', respectively). In FIG. 3A, the light-receiving surfaces of the photoelectric devices 7A and 7B are divided into mutually insulated light-receiving portions 70A, 71A, 72A and 70B, 71B, 72B, respectively. The mutually corresponding light-receiving portions 70A and 70B, 71A and 71B, and 72A and 72B of the light-receiving surfaces of the photoelectric devices 7A and 7B are symmetrically identical in configuration. FIGS. 3B, 3C, 3D, 3E and 3F show different forms of division from FIG. 3A. The arrangement relation between the light-receiving surfaces of the photoelectric devices 7A and 7B shown in FIG. 3 does not always intactly represent the arrangement relation between the light-receiving surfaces of the photoelectric devices shown in FIGS. 1 or 2, but the actual arrangement relation may sometimes differ in direction from the relation shown in FIG. 3 due to the inversion of the image resulting from the presence of the relay lenses 5A, 5B or an optical system suitably added depending on the spatial limiting conditions.

Reference is now had to FIG. 4 to describe the areas on the phototaking picture dividedly metered by the respective light-receiving portions of such light-receiving surfaces. FIG. 4A shows the divided metering areas of the light-receiving surfaces of FIG. 3A. Reference numeral 11 represents the outer circumference of the phototaking picture, the solid-line hatching shows the metering area shared by the photoelectric device 7A, and the broken-line hatching shows metering area shared by the photoelectric device 7B. A small metering area 70A' is an area metered by the light-receiving portion 70A of the light-receiving surface of the photoelectric device 7A, and small metering areas 71A', 72A' 70B', 71B' and 72B' are areas likewise metered by the light-receiving portions 71A, 72A, 70B, 71B and 72B. As is apparent from this, the metering areas 72A' and 72B', respectively in the center of the phototaking picture overlap each other and are overlappingly metered by the light-receiving portions 72A and 72B of the photoelectric devices 7A and 7B of the photoelectric devices 7A and 7B.

In this manner, the photoelectric devices 7A and 7B together meter the entire phototaking picture and each of them overlappingly meters the area 72A' (72B'), but they meter the phototaking picture by dividing it into two. The corresponding light-receiving portions 70A and 70B, 71A and 71B and 72A and 72B respectively meter the areas symmetrical with respect to the longitudinal bisector of the phototaking picture.

Figure 3B:
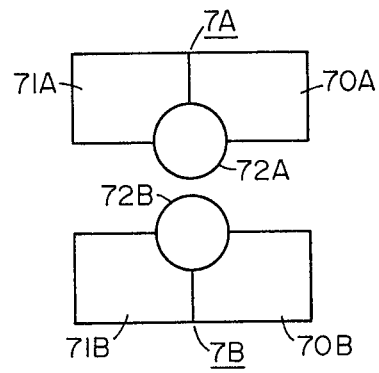
Figure 3C:
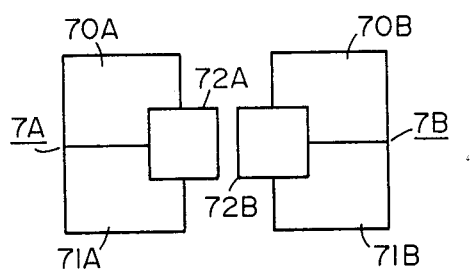
Figure 3D:
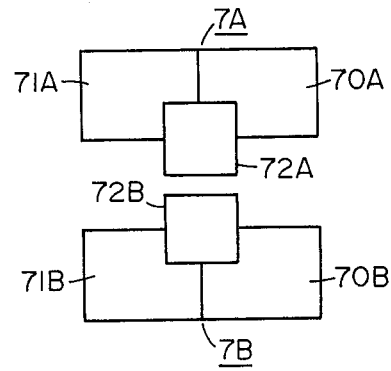
Figure 3E:
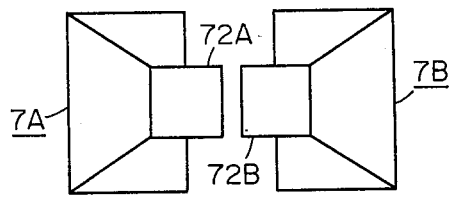
Figure 3F:
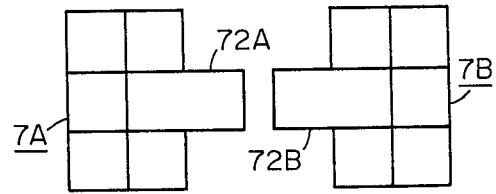

What has been described above is an example in which the phototaking picture is longitudinally divided into two, but FIG. 4B corresponds to FIG. 3B and shows an example in which the phototaking picture is laterally divided into two. Of course, where the phototaking picture is laterally divided as shown in FIGS. 3B and 3D, the relay lenses 5A', 5B' and the photoelectric devices 7A', 7B' are arranged as shown in FIG. 2C. Whether the phototaking picture is divided longitudinally or laterally is related, for example, to the distinction between a cinecamera and a still camera, the size of the phototaking picture, the structure of the finder, etc., and the present invention is not limited to the use of a pentaprism.

Also, the outputs of the light-receiving portions 70A–72A and 70B–72B of the photoelectric devices 7A and 7B shown in FIG. 3A are taken out from a terminal T, but since the light-receiving portions 72A and 72B meter the identical metering area on the phototaking picture, the outputs therefrom are averaged by an average circuit 13 and this average output is regarded as the metering value regarding the overlapping metering area 72A' (72B') in the center of the phototaking picture. Although not shown, this also holds true with respect to FIGS. 3B to 3F. For the processing of the metering outputs regarding these metering areas, use may be made of the processing system disclosed in the aforementioned Japanese Laid-Open Patent Application No. 17725/1978 or Japanese Laid-Open Patent Application No. 23936/1977.

FIGS. 5A to 5D are similar to FIG. 3 but show the configuration of the light-receiving surfaces of the photoelectric devices in a case where the overlapping metering areas are deviated from the center of the phototaking picture.

The present embodiment has been described with respect to the metering device of a single lens reflex camera, whereas the present invention is not restricted to a single lens reflex camera and in that case, for example, a pair of image forming lenses for forming the image of an object directly on the light-receiving surfaces of the pair of photoelectric devices may be provided instead of the pair of relay lenses 5A, 5B for causing the object image on the focusing plate to be reimaged on the pair of photoelectric devices 7A, 7B.

As is apparent from the foregoing description, according to the present invention, more than one half area of the object field is imaged on a corresponding photoelectric device by one image forming lens and another more than one half area of the object field overlapping said more than one half area is imaged on a corresponding photoelectric device by the other image forming lens and therefore, the two image forming lenses need not have a particularly wide angle of view and this leads to the possibility of improving the image forming performance as well as the possibility of making the entire metering device compact.

Also, regarding the metering area which requires a high metering accuracy, metering is effected overlappingly by a pair of photoelectric devices and therefore, as in the illustrated embodiment, by taking the average of the outputs of the two photoelectric devices regarding the overlapping metering areas, it is possible to reduce the metering error resulting from the deviation of the installed positions of the photoelectric devices and the error resulting from the irregularities of the metering characteristics of the two photoelectric devices.

Particularly, if this overlapping metering area is the center of the phototaking picture, it is preferable in that the probability of a major object coming there is high.

We claim:

1. A metering device of a camera comprising:
   a first photoelectric device provided with a light-receiving surface divided into a plurality of light-receiving portions each having a predetermined configuration;
   a second photoelectric device provided with a light-receiving surface divided into a plurality of light-receiving portions having configurations corresponding to said plurality of light-receiving portions of said first photoelectric device; and
   optical means for forming an object field image on the light-receiving surfaces of said first and second photoelectric devices so that metering areas metered by the light-receiving surfaces of said first and second photoelectric devices partly overlap each other on a phototaking picture and that the entire phototaking picture is substantially covered by said metering areas;
   said photoelectric devices being disposed so that the metering area, on said phototaking picture, of each of the light-receiving portions of the light-receiving surface of said first photoelectric device and the metering area, on said phototaking picture, of each of the light-receiving portions of the light-receiving surface of said second photoelectric device corresponding to the light-receiving portions of said first photoelectric device are substantially symmetrical with respect to a bisector of said phototaking picture.

2. The metering device according to claim 1, further comprising an average circuit for producing the average value of the metering outputs of said two photoelectric devices regarding said overlapping metering areas as the metering output regarding said overlapping metering areas.

3. The metering device according to claim 2, wherein said overlapping metering areas are substantially the central portion of said phototaking picture.

* * * * *

UNITED STATES PATENT AND TRADEMARK OFFICE
CERTIFICATE OF CORRECTION

PATENT NO. : 4,274,721
DATED : June 23, 1981
INVENTOR(S) : Toru Fukuhara et al

It is certified that error appears in the above—identified patent and that said Letters Patent is hereby corrected as shown below:

Column 3, line 8, after "72B", insert --, respectively--.
Column 3, line 10, delete "respectively".

Signed and Sealed this

Fifth Day of October 1982

[SEAL]

Attest:

GERALD J. MOSSINGHOFF

Attesting Officer    Commissioner of Patents and Trademarks